United States Patent [19]
Carter et al.

[11] Patent Number: 6,017,994
[45] Date of Patent: *Jan. 25, 2000

[54] UTILITY OF WATER-SOLUBLE POLYMERS HAVING PENDANT DERIVATIZED AMIDE FUNCTIONALITIES FOR SCALE CONTROL

[75] Inventors: Phillip W. Carter, Naperville; John D. Morris; Peter E. Reed, both of Plainfield; Jiansheng Tang, Naperville, all of Ill.; Jin-Shan Wang, Rochester, N.Y.; Paul R. Young, Wheaton, Ill.

[73] Assignee: Nalco Chemical Company, Naperville, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,154

[22] Filed: Jun. 27, 1997

Related U.S. Application Data

[63] Continuation-in-part of application No. 08/792,610, Jan. 31, 1997, Pat. No. 5,726,267.

[51] Int. Cl.⁷ ..................................................... C08L 39/00
[52] U.S. Cl. ....................................... 524/555; 526/303.1
[58] Field of Search .................... 524/555; 526/303.1, 526/304

[56] References Cited

U.S. PATENT DOCUMENTS

| | | |
|---|---|---|
| 4,088,678 | 5/1978 | Matt et al. . |
| 4,098,987 | 7/1978 | Barua ......................... 526/304 |
| 4,111,922 | 9/1978 | Beede ......................... 524/555 |
| 4,228,018 | 10/1980 | Hunter .................. 252/8.55 |
| 4,239,671 | 12/1980 | Fink ........................... 526/304 |
| 4,430,481 | 2/1984 | Hunter ................... 525/328.4 |
| 4,432,884 | 2/1984 | Kawasaki et al. . |
| 4,440,652 | 4/1984 | Hunter .................. 252/8.55 |
| 4,680,135 | 7/1987 | Cha et al. . |
| 4,680,339 | 7/1987 | Fong . |
| 4,731,419 | 3/1988 | Fong . |
| 4,744,949 | 5/1988 | Hoots ......................... 422/15 |
| 4,784,774 | 11/1988 | Amjad ....................... 210/699 |
| 4,818,506 | 4/1989 | Lin et al. . |
| 4,847,410 | 7/1989 | Lickei et al. . |
| 4,872,995 | 10/1989 | Chen et al. . |
| 4,885,345 | 12/1989 | Fong . |
| 4,921,903 | 5/1990 | Fong ....................... 526/303.1 |
| 4,933,090 | 6/1990 | Gill et al. . |
| 4,999,161 | 3/1991 | Pierce et al. . |
| 5,049,310 | 9/1991 | Johnson et al. . |
| 5,071,933 | 12/1991 | Müller et al. . |
| 5,084,520 | 1/1992 | Fong . |
| 5,209,885 | 5/1993 | Quadir et al. . |
| 5,266,243 | 11/1993 | Kneller et al. . |
| 5,338,477 | 8/1994 | Chen ......................... 252/180 |
| 5,358,911 | 10/1994 | Moeggenborg et al. . |
| 5,393,343 | 2/1995 | Darwin et al. . |
| 5,475,047 | 12/1995 | Abraham .................. 524/555 |
| 5,487,855 | 1/1996 | Moeggenborg et al. . |
| 5,525,665 | 6/1996 | Moeggenborg et al. . |
| 5,532,307 | 7/1996 | Bogan, Jr. . |
| 5,567,353 | 10/1996 | Bogan, Jr. . |
| 5,627,145 | 5/1997 | Thevissen . |
| 5,684,104 | 11/1997 | Funk ......................... 526/304 |
| 5,726,267 | 3/1998 | Howland et al. . |

FOREIGN PATENT DOCUMENTS

| | | |
|---|---|---|
| 0 206 814 A2 | 12/1986 | European Pat. Off. . |
| 0206814 | 12/1986 | European Pat. Off. . |
| 05009232 A2 | 1/1993 | Japan . |
| 05070212 A2 | 3/1993 | Japan . |
| 05294712 A2 | 11/1993 | Japan . |
| 06072759 A2 | 3/1994 | Japan . |
| 06313004 A2 | 11/1994 | Japan . |
| 07010943 A2 | 1/1995 | Japan . |
| 07101778 A2 | 4/1995 | Japan . |
| 07133160 A2 | 5/1995 | Japan . |
| 07144970 A2 | 6/1995 | Japan . |

*Primary Examiner*—Paul R. Michl
*Attorney, Agent, or Firm*—Michael B. Martin; Thomas M. Breininger

[57] ABSTRACT

Methods for preventing corrosion and scale deposition in aqueous media are disclosed. The methods utilize water-soluble polymers having pendant derivatized amide functionalities for scale inhibition.

10 Claims, No Drawings

UTILITY OF WATER-SOLUBLE POLYMERS HAVING PENDANT DERIVATIZED AMIDE FUNCTIONALITIES FOR SCALE CONTROL

The present application is a continuation-in-part of Ser. No. 08/792,610, filed Jan. 31, 1997 by Christopher P. Howland et al., entitled "Preparation and Utility of Water-Soluble Polymers Having Pendant Derivatized Amide, Ester or Ether Functionalities as Ceramics Dispersants and Binders", the disclosure of which is incorporated herein by reference, now U.S. Pat. No. 5,726,267.

FIELD OF THE INVENTION

Methods for preventing corrosion and scale deposition in aqueous media are disclosed. The methods utilize water-soluble polymers having pendant derivatized amide functionalities for scale inhibition.

BACKGROUND OF THE INVENTION

The utilization of water which contains certain inorganic impurities, and the production and processing of crude oil water mixtures containing such impurities, is plagued by the precipitation of these impurities with subsequent scale formation. In the case of water which contains these contaminants the harmful effects of scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example, scale formed upon the surfaces of storage vessels and conveying lines for process water may break loose and these large masses of deposit are entrained in and conveyed by the process water to damage and clog equipment through which the water is passed, e.g., tubes, valves, filters and screens. In addition, these crystalline deposits may appear in, and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms an insulating or thermal opacifying barrier which impairs heat transfer efficiency as well as impeding flow through the system.

While calcium sulfate and calcium carbonate are primary contributors to scale formation, other salts of alkaline-earth metals and the aluminum silicates are also offenders, e.g., magnesium carbonate, barium sulfate, the aluminum silicates provided by silts of the bentonitic, illitic, kaolinitic, etc., types.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form. Calcium carbonate is the most common form of scale.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes and harbors bacteria. This scale is an expensive problem in many industrial water systems causing delays and shutdowns for cleaning and removal.

Scale deposits are generated and extended principally by means of crystal growth; and various approaches to reducing scale development have accordingly included inhibition of crystal growth, modification of crystal growth and dispersion of the scale-forming minerals.

Many other industrial waters, while not being scale forming, tend to be corrosive. Such waters, when in contact with a variety of metal surfaces such as ferrous metals, aluminum, copper and its alloys, tend to corrode one or more of such metals or alloys. A variety of compounds have been suggested to alleviate these problems. Such materials are low molecular weight polyacrylic acid polymers. Corrosive waters of this type are usually acidic in pH and are commonly found in closed recirculating systems.

Numerous compounds have been added to these industrial waters in an attempt to prevent or reduce scale and corrosion. One such class of materials are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinicobis (succinic acids) which are described in U.S. Pat. No. 4,088,678.

Polymeric treatments have been disclosed in U.S. Pat. Nos. 4,680,339; 4,731,419; 4,885,345 and 5,084,520. Utility for the treatments has been disclosed to be as dispersants in water treatment, scale inhibitors in industrial and natural waters, flocculants, coagulants and thickeners.

Moreover, methods of controlling calcium oxalate scale with an effective amount of a water-soluble (meth)acrylic acid/allyl ether copolymer have been disclosed in U.S. Pat. No. 4,872,995. A method for controlling silica/silicate deposition, including calcium and magnesium silicate by addition of a phosphonate and a water-soluble terpolymer of an unsaturated carboxylic acid monomer, an unsaturated sulfonic compound and an unsaturated polyalkylene oxide is disclosed in U.S. Pat. No. 4,933,090. Acrylate/acrylamide copolymers have been disclosed as useful for the inhibition of gypsum scale in flue gas desulfurization processes in U.S. Pat. No. 4,818,506.

A method of inhibiting phosphonate scale formation on and corrosion of iron containing solid surfaces in contact with industrial waters with a water-soluble zinc stabilizing polymer is disclosed in U.S. Pat. No. 5,049,310. A method for preventing condensate corrosion in boilers comprising treating the condensate with a water-soluble polymeric composition comprising a an acrylic acid polymer containing acrylic acid groups in the form of amides of a water-insoluble aliphatic primary or secondary amine is disclosed in U.S. Pat. No. 4,999,161. However, there is still a need for polymeric treatments which provide an increased efficiency for corrosion and scale control.

SUMMARY OF THE INVENTION

Methods for preventing corrosion and scale deposition in aqueous media are disclosed. The methods utilize water-soluble polymers having pendant derivatized amide functionalities for scale inhibition.

DESCRIPTION OF THE INVENTION

The invention is a method for preventing scale formation on metal surfaces in contact with scale-forming industrial water within an industrial system which comprises the step of treating said water with an effective scale-inhibiting amount of a water-soluble polymer having distributed repeating mer units represented by the formula

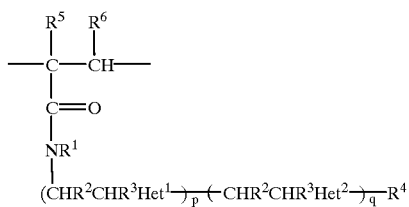

I wherein $R^1$ is selected from the group consisting of hydrogen, and $C_1$–$C_3$ alkyl; p and q are integers from 1–10; $R^2$ and $R^3$ are selected from the group consisting of hydrogen and $C_1$–$C_3$ alkyl; $Het^1$ and $Het^2$ selected from the group consisting of oxygen and nitrogen; $R^4$ is selected from the group consisting of hydrogen, and $C_1$–$C_{20}$ alkyl; $R^5$ and $R^6$ are selected from the group consisting of hydrogen, carboxylate, $C_1$–$C_3$ alkyl, and a cycloalkyl group of 3 to 6 carbon atoms formed by the linkage of $R^5$ and $R^6$ as a ring.

For any embodiment of this invention, the industrial water may be cooling water. Furthermore, the scale may selected from the group consisting of calcium phosphate, zinc phosphate, iron (hydr)oxide, aluminum hydroxide, calcium sulfate, barium sulfate, clay, silt, magnesium phosphate, magnesium carbonate and calcium carbonate. Any embodiment of the polymers of this invention are also active against scale caused by calcium and magnesium salts of HEDP and calcium and magnesium salts of PBTC. Furthermore, the cooling water may contain a biocide, corrosion inhibitors, or other scale inhibitors. The industrial water may be industrial process water selected from the group consisting of mining process water, pulp and paper process water and oilfield process water.

The invention is also a method for preventing scale formation on metal surfaces in contact with scale-forming industrial water within an industrial system which comprises the step of treating said water with an effective scale-inhibiting amount of a water-soluble polymer having:

A) a mer unit of the formula

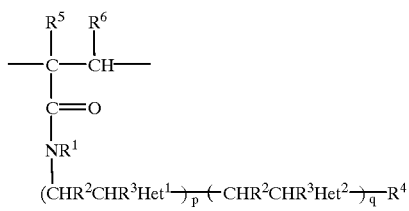

I wherein $R^1$ selected from the group consisting of hydrogen, and $C_1$–$C_3$ alkyl; p and q are integers from 1–10; $R^2$ and $R^3$ are selected from the group consisting of hydrogen and $C_1$–$C_3$ alkyl; $Het^1$ and $Het^2$ selected from the group consisting of oxygen and nitrogen; $R^4$ is selected from the group consisting of hydrogen, and $C_1$–$C_{20}$ alkyl; $R^5$ and $R^6$ are selected from the group consisting of hydrogen, carboxylate, $C_1$–$C_3$ alkyl, and a cycloalkyl group of 3 to 6 carbon atoms formed by the linkage of $R^5$ and $R^6$ as a ring; and B) a mer unit selected from the group consisting of acrylic acid, methacrylic acid, acrylamide, methacrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof. For any of structures I–III, the salts of the comonomers will also have utility.

A specific polymer applicable is identified as one wherein p=1; q=1; $R^1$, $R^2$, $R^3$, $R^4$, $R^5$, and $R^6$ are hydrogen; and $Het^1$ and $Het^2$ are oxygen in formula I of step A; and the mer units of step B are acrylic acid and acrylamide for the water-soluble polymer. Another useful polymer is one wherein p=1; q=1; $R^1$, $R^2$, $R^3$, $R^4$, $R^5$, and $R^6$ are hydrogen; and $Het^1$ and $Het^2$ are oxygen in formula I of step A; and the mer units of step B are acrylic acid for the water-soluble polymer. Yet another useful polymer is one wherein p=1; q=1; $R^1$, $R^2$, $R^3$, $R^4$, $R^5$, and $R^6$ are hydrogen; and $Het^1$ and $Het^2$ are oxygen in formula I of step A; and the mer units of step B are maleic acid and acrylic acid for the water-soluble polymer. Another useful polymer is one wherein p=1, q=1, $Het^1$ is nitrogen, $Het^2$ is oxygen and $R^1$, $R^2$, $R^3$, $R^4$, $R^5$ and $R^6$ are hydrogen in formula I of step A; and the mer units of step B are acrylic acid and acrylamide for the water-soluble polymer. Moreover, wherein p=1, q=1, $Het^1$ is nitrogen, $Het^2$ is oxygen and $R^1$, $R^2$, $R^3$, $R^4$, $R^5$ and $R^6$ are hydrogen in formula I of step A; and the mer units of step B are acrylic acid is also a useful water-soluble polymer. Wherein p=1, q=1, $Het^1$ is nitrogen, $Het^2$ is oxygen and $R^1$, $R^2$, $R^3$, $R^4$, $R^5$ and $R^6$ are hydrogen in formula I of step A; and the mer units of step B are maleic acid and acrylic acid, is another applicable water-soluble polymer.

The invention is also a method for preventing scale formation on metal surfaces in contact with scale-forming industrial water within an industrial system which comprises the step of treating said water with an effective scale-inhibiting amount of a water-soluble polymer having distributed repeating mer units of the formula

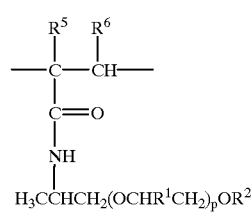

II wherein $R^1$ is selected from the group consisting of hydrogen and $C_1$–$C_3$ alkyl groups, p is an integer from 0–50; $R^2$ is selected from the group consisting of hydrogen and $C_1$–$C_{20}$ alkyl groups; $R^5$ and $R^6$ are selected from the group consisting of hydrogen, carboxylates, $C_1$–$C_3$ alkyl groups, and a cycloalkyl group of 3 to 6 carbon atoms formed by the linkage of $R^5$ and $R^6$ as a ring, with the proviso that when p is 0, $R^2$ is not hydrogen.

The invention is also a method for preventing scale formation on metal surfaces in contact with scale-forming industrial water within an industrial system which comprises the step of treating said water with an effective scale-inhibiting amount of a water-soluble polymer having: A) a mer unit of the formula

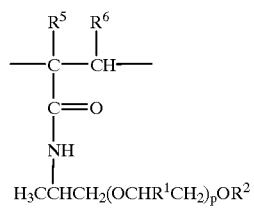

II

H$_3$CCHCH$_2$(OCHR$^1$CH$_2$)$_p$OR$^2$ wherein R$^1$ is selected from the group consisting of hydrogen and C$_1$–C$_3$ alkyl groups, p is an integer from 0–50; R$^2$ is selected from the group consisting of hydrogen and C$_1$–C$_{20}$ alkyl groups; R$^5$ and R$^6$ are selected from the group consisting of hydrogen, carboxylates, C$_1$–C$_3$ alkyl groups, and a cycloalkyl group of 3 to 6 carbon atoms formed by the linkage of R$^5$ and R$^6$ as a ring, with the proviso that when p=0, R$^2$ is not hydrogen; and B) a mer unit selected from the group consisting of acrylic acid, methacrylic acid, acrylamide, methacrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

For the practice of this invention, p may be an integer of from 10 to 25, R$^1$ may be selected from the group consisting of hydrogen and methyl groups, R$^2$ may be a methyl group, R$^5$ may be hydrogen and R$^6$ may be hydrogen and the mer units of step B may be acrylic acid. Additionally, p may be an integer of from 10 to 25, R$^1$ may be selected from the group consisting of hydrogen and methyl groups, R$^2$ may be a methyl group, R$^5$ and R$^6$ may be hydrogen and the mer units of step B may be acrylic acid and acrylamide. Furthermore, another useful polymer is one wherein p is an integer of from 10 to 25, R$^1$ is selected from the group consisting of hydrogen and methyl groups, R$^2$ is a methyl group, R$^5$ is hydrogen and R$^6$ is hydrogen and the mer units of step B are maleic acid and acrylic acid.

Another aspect of this invention is a method for preventing scale formation on metal surfaces in contact with scale-forming industrial water within an industrial system which comprises the step of treating said water with an effective scale-inhibiting amount of a water-soluble polymer having distributed repeating mer units of the formula

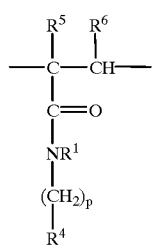

III wherein R$^1$ is selected from the group consisting of hydrogen, and C$_1$–C$_3$ alkyl; p is an integer from 1–10; R$^4$ is selected from the group consisting Of C$_1$–C$_6$ alkyl groups, C$_1$–C$_6$ alkyl ether groups and morpholino groups; R$^5$ and R$^6$ are selected from the group consisting of hydrogen, carboxylate, C$_1$–C$_3$ alkyl, and a cycloalkyl group of 1 to 6 carbon atoms formed by the linkage of R$^5$ and R$^6$ as a ring.

Yet another aspect of this invention is a method for preventing scale formation on metal surfaces in contact with scale-forming industrial water within an industrial system which comprises the step of treating said water with an effective scale-inhibiting amount of a water-soluble polymer having: A) a mer unit of the formula

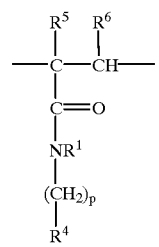

III wherein R$^1$ is selected from the group consisting of hydrogen, and C$_1$–C$_3$ alkyl; p is an integer from 1–10; R$^4$ is selected from the group consisting of C$_1$–C$_6$ alkyl groups, C$_1$–C$_6$ alkyl ether groups and morpholino groups; R$^5$ and R$^6$ are selected from the group consisting of hydrogen, carboxylate, C$_1$–C$_3$ alkyl, and a cycloalkyl group of 1 to 6 carbon atoms formed by the linkage of R$^5$ and R$^6$ as a ring; and B) a mer unit selected from the group consisting of acrylic acid, methacrylic acid, acrylamide, methacrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof.

For the practice of the method described above, a useful polymer is one wherein R$^1$, R$^5$ and R$^6$ are hydrogen, p is 2 and R$^4$ is a morpholino group in formula III of step A and the mer units of step B are acrylic acid and acrylamide. Another example of a useful polymer is one wherein R$^1$, R$^5$ and R$^6$ are hydrogen, p is 2 and R$^4$ is a morpholino group in formula III of step A and the mer units of step B are acrylic acid for the water-soluble polymer. Yet another useful polymer is one wherein R$^1$, R$^5$ and R$^6$ are hydrogen, p is 2 and R$^4$ is a morpholino group in formula III of step A and the mer units of step B are acrylamide for the water-soluble polymer. Furthermore, wherein R$^1$, R$^5$ and R$^6$ are hydrogen, p is 3 and R$^4$ is a methoxy group in formula III of step A; and the mer units of step B are acrylic acid and acrylamide; wherein R$^1$, R$^5$ and R$^6$ are hydrogen, p is 3 and R$^4$ is a methoxy group in formula III of step A; and the mer units of step B are acrylic acid; wherein R$^1$, R$^5$ and R$^6$ are hydrogen, p is 3 and R$^4$ is a methoxy group in formula III of step A; and the mer units of step B are maleic acid and acrylic acid are all examples of applicable water-soluble polymers.

The polymers described herein for the practice of this invention may range in molecular weight from about 1,000 to about 1,000,000. Preferably, the molecular weight will be from about 5,000 to about 100,000. For the polymers defined herein, the mer units defined by formulas I–III will range from 1 to 75% of the total number of mer units in the polymer. Preferably, the mer units defined as formulas I–III will be 5–50% of the total number of mer units in the polymer.

The polymer classes described herein contain amide mer units which are functionalized with pendant groups. These pendant groups confer favorable properties to the polymer for use as scale inhibitors. The polymers may be produced by polymerization using specific monomers, such as might be produced by the copolymerization of acrylic acid with an N-methoxy propyl acrylamide, methoxyethoxy acrylate, methoxyethoxy maleate or N-methoxypropyl acrylate comonomer. The polymer so produced would contain a hydrophilic backbone with pendant groups.

Alternatively, pendant groups could be introduced into the polymer after polymerization. For example, polyacrylic acid could be amidated with an ethoxylated/propoxylated amine, such as those available from Texaco under the trade name Jeffamine series, to produce a polymer with a hydrophilic backbone and ethyleneoxy/propyleneoxy pendant groups. During the amidation process, cyclic imide structures might form between two adjacent carboxylate or carboxamide units on the polymer backbone. These imide structures are not expected to have an adverse effect on the performance of the polymers.

Typical metal surfaces in cooling water systems which may be subjected to corrosion or scale deposition are made of stainless steel, mild steel and copper alloys such as brass among others.

The polymers may be effective against other types of scale including magnesium silicate, calcium sulfate, barium sulfate and calcium oxalate. The polymers are also effective in extremely hard water.

The polymers may be utilized in conjunction with other treatments, for example biocides, other ferrous metal corrosion inhibitors, yellow metal corrosion inhibitors, scale inhibitors, dispersants, and additives. Such a combination may exert a synergistic effect in terms of corrosion inhibitors, scale inhibition, dispersancy and bacterium control.

Examples of biocides which can be used in combination with the polymers include: stabilized bleach, chlorine and hypobromite, bromine (oxidizing biocides). Also, non-oxidizing biocides such as glutaraldehyde, isothiazolones (mixtures of 5-chloro-2-methyl-4-isothiazolin-3-one and 2-methyl-4-isothiazolin-3-one), sulfamic acid-stabilized bleach and sulfamic acid-stabilized bromine are applicable.

Additionally, the polymers may be utilized in conjunction with other corrosion and scale inhibitors. Thus, the polymers may be effective in combination with other inhibitors such as hydroxyethylidene-1,1-diphosphonic acid (HEDP), 2-phosphonobutane-1,2,4-tricarboxylic acid (PBTC), 2-hydroxyethylimine bis(methylene phosphonic acid) N-oxide (EBO), methylene diphosphonic acid (MDP), hexamethylenediamine-N,N,N',N'-tetra(methylene phosphonic acid), amino and tris(methylene phosphonic acid), phosphorus-containing inorganic chemicals such as orthophosphates, pyrophosphates, polyphosphates; hydroxycarboxylic acids and their salts such as gluconic acids; glucaric acid; $Zn^{2+}$, $Ce^{2+}$, $MoO_6^{2-}$, $WO_4^{2-}$, and nitrites.

The polymers may also be effectively utilized in conjunction with other polymeric treating agents, for example anionic polymers of under 200,000 MW. Such polymers include acrylic, methacrylic or maleic acid containing homo-, co- or terpolymers.

Examples of yellow metal corrosion inhibitors that can be used in combination with the polymers include benzotriazole, tolyltriazole, mercaptobenzothiazole and other azole compounds.

Examples of other scale inhibitors that can be used in conjunction with the polymers include polyacrylates, polymethacrylates, copolymers of acrylic acid and methacrylate, copolymers of acrylic acid and acrylamide, poly(maleic acid) copolymers of acrylic acid and maleic acid, polyesters, polyaspartic acid, functionalized polyaspartic acid, terpolymers of acrylic acid, and acrylamide/sulfomethylated acrylamide copolymers, HEDP (1-hydroxyethylidene-1,1-diphosphonic acid), PBTC (2-phosphonobutane-1,2,4-tricarboxylic acid), and AMP (amino tri(methylene phosphonic acid).

To treat a cooling water system, the compounds may be added to the cooling tower basin or at any other location wherein good mixing can be achieved in a short time.

The term system as utilized herein is defined as any industrial process which utilizes water. The system could contain primarily aqueous fluids, or primarily non-aqueous fluids, but also contain water. Such systems are found in industrial processes which utilize boilers or cooling water towers. For example, the food processing industry is an industry which requires such a system.

The polymers may be added to the scale-forming or corrosive industrial process water in an amount of from about 0.5 ppm to about 500 ppm. Preferably, the polymers may be added in an amount of from about 2 ppm to about 100 ppm. Most preferably, the polymers may be added in an amount of from about 5 ppm to about 50 ppm.

The following examples are presented to describe preferred embodiments and utilities of the invention and are not meant to limit the invention unless otherwise stated in the claims appended hereto.

EXAMPLE 1

The synthesis of an ammonium acrylate/N-(hydroxyethoxy)ethyl acrylamide copolymer was effected with the following reactants in the following amounts:

| Reactant | Amount (g) |
| --- | --- |
| Poly(AA), 25.6 weight % in water | 100.00 |
| Aminoethoxyethanol | 11.92 |
| Ammonium Hydroxide, 29 weight % | 2.51 |

To prepare the polymer, poly(AA) (25.6 weight percent poly(acrylic acid) solution, pH=3.8, 16,000 MW) was placed in a beaker, which was cooled using an ice bath. Aminoethoxyethanol (available from Huntsman Petrochemical Co., in Houston, Tex.) was added dropwise into the poly(acrylic acid)/water solution with vigorous stirring. Afterwards, the solution was stirred for another 15 minutes. Aqueous caustic was added to adjust the pH to about 5. Next, the reaction mixture was transferred into a 300 mL Parr reactor with a pressure rating of at least 800 psi. The reactor then was assembled and purged with nitrogen for approximately 60 minutes. The Parr reactor was then slowly heated to 160° C. (or less, as the case may be) and held at that temperature for 8 hours (or more, as the case may be). Afterwards, the reactor was cooled to room temperature and the pressure released. The product was then transferred to storage.

$^{13}C$ NMR confirmed product formation. The content of N-(hydroxyethoxy)ethyl acrylamide was 21 mole %, based on the total moles of mer units on the polymer, which represents both secondary amide and imide mer units. The polymer's molecular weight was 24,000.

EXAMPLE 2

The synthesis of an ammonium acrylate/acrylamide/N-(hydroxyethoxy)ethyl acrylamide terpolymer was effected in the following manner with the reactants in the amounts listed below:

| Reactant | Amount (g) |
| --- | --- |
| Poly(NH$_4$AA/AcAm), 50/50 mol % solution polymer, 38.2 weight % | 300.00 |
| Aminoethoxyethanol | 114.00 |

To prepare the polymer, Poly(NH$_4$AA/AcAm) (50/50 mol % ammonium acrylate/acrylamide copolymer, 38.2 weight percent, pH=5.5, 33,000 MW) was placed in a beaker, which was cooled using an ice bath. Aminoethoxyethanol (available from Huntsman Petrochemical Co., in Houston, Tex.) was added dropwise into the above water solution with vigorous stirring (pH=10.1). Afterwards, the solution was stirred for another 15 minutes. Next, the reaction mixture was transferred into a 600 mL Parr reactor with a pressure rating of at least 800 psi. The reactor then was assembled and purged with nitrogen for approximately 60 minutes. The Parr reactor was then slowly heated to 138° C. and held at that temperature for 14 hours. Afterwards, the reactor was cooled to room temperature and the pressure released. The product was then transferred to storage.

$^{13}$C NMR confirmed product formation. The content of N-(hydroxyethoxy)ethyl acrylamide was 33.3 mole %, based on the total moles of mer units on the polymer. The polymer had a molecular weight of 35,000, and a mole ratio of N-(hydroxyethoxy)ethyl acrylamide/acrylic acid/ acrylamide of about 33/41/26.

EXAMPLE 3

The synthesis of a sodium acrylate/acrylamide/N-(hydroxyethoxy)ethyl acrylamide terpolymer was effected in the following manner with the reactants in the amounts listed below:

| Reactant | Amount (g) |
| --- | --- |
| Poly(NaAA/AcAm), 50/50 mol % solution polymer, 32.0 weight % | 100.00 |
| Aminoethoxyethanol | 32.00 |
| Sulfuric Acid (95%) | 11.5 |

To prepare the polymer, Poly(NaAA/AcAm) (50/50 mol % sodium acrylate/acrylamide copolymer, 32.0 weight %, pH=5.2, 11,000 MW) was placed in a beaker, which was cooled using an ice bath. Aminoethoxyethanol (available from Huntsman Petrochemical Co., in Houston, Tex.) was added dropwise into the above water solution with vigorous stirring. Afterwards, the solution was stirred for another 15 minutes. Sulfuric acid was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 12 hours. Afterwards, the reactor was cooled to room temperature and the pressure released. The product was then transferred to storage.

$^{13}$C NMR confirmed product formation. The content of N-(hydroxyethoxy)ethyl acrylamide was 33 mole %, based on the total moles of mer units on the polymer. The mole ratio was about 42/22/33 of acrylic acid/acrylamide (including 3% imide mer units)/N-(hydroxyethoxy)ethyl acrylamide (including imide mer units). The product polymer had a molecular weight of 12,000.

EXAMPLE 4

The synthesis of a sodium acrylate/acrylamide/N-Methoxypropyl acrylamide terpolymer was effected in the following manner with the reactants in the amounts listed below:

| Reactant | Amount (g) |
| --- | --- |
| Poly(NaAA/AcAm), 50/50 mol % solution polymer, 32.0 weight % | 100.00 |
| Methoxypropylamine | 23.32 |
| Sulfuric Acid (95%) | 11.23 |

To prepare the polymer, Poly(NaAA/AcAm) (50/50 mol %, 32.0 weight %, pH=5.2, 11,000 MW) was placed in a beaker, which was cooled using an ice bath. Methoxypropylamine (available from Aldrich Chem. Co., in Milwaukee, Wis.) was added dropwise into the above water solution with vigorous stirring. Afterwards, the solution was stirred for another 15 minutes. Sulfuric acid was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 12 hours. Afterwards, the reactor was cooled to room temperature and the pressure released. The product was then transferred to storage.

$^{13}$C NMR confirmed product formation. The content of N-methoxypropyl acrylamide was 34.2 mole %, based on the total moles of mer units on the polymer. The mole ratio of the product was about 41/17/34 which represents acrylic acid/acrylamide (including 6% imide mer units)/ methoxypropyl acrylamide (including imide mer units). The product's molecular weight was 11,000.

EXAMPLE 5

The synthesis of a sodium acrylate/acrylamide/N-hydroxy (ethylamino)ethyl acrylamide terpolymer was effected in the following manner with the reactants in the amounts listed below:

| Reactant | Amount (g) |
| --- | --- |
| Poly(NaAA/AcAm), 50/50 mol % solution polymer, 24.0 weight % | 80.00 |
| (Aminoethylamino)ethanol | 19.02 |
| Sulfuric Acid (95%) | 12.23 |

To prepare the polymer, Poly(NaAA/AcAm) (50/50 mol %, 24.0 weight %, pH=3.5, 15,000 MW) was placed in a beaker, which was cooled using an ice bath. (Aminoethylamino)ethanol (available from Aldrich Chem. Co., in Milwaukee, Wis.) was added dropwise into the above water solution with vigorous stirring. Afterwards, the solution was stirred for another 15 minutes. Sulfuric acid was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 14 hours. Afterwards, the reactor was cooled to room temperature and the pressure released. The product was then transferred to storage.

$^{13}$C NMR confirmed product formation. The content of N-hydroxy(ethylamino) ethyl acrylamide was 46 mole %, based on the total moles of mer units on the polymer, representing both secondary amide and imide mer units. The mole ratio of the product was about 46/51/3 N-hydroxy (ethylamino)ethyl acrylamide/acrylic acid/acrylamide. The product polymer's molecular weight was 15,000.

EXAMPLE 6

The synthesis of an acrylic acid/acrylamide/ N-(hydroxyethoxy)ethyl acrylamide terpolymer was effected in the following manner with the reactants in the amounts listed below:

| Reactant | Amount (g) |
|---|---|
| Poly(AcAm), 50 weight % | 50.00 |
| Aminoethoxyethanol | 12.9 |
| Deionized water | 50.0 |
| Sulfuric Acid (95%) | 6.1 |

To prepare the polymer, Poly(AcAm) (50 wt %, available from Aldrich Chemical Co., 10,000 MW) was placed in a beaker, which was cooled using an ice bath. Aminoethoxyethanol (available from Huntsman Petrochemical Co., in Houston, Tex.) was added dropwise into the above water solution with vigorous stirring. Afterwards, the solution was stirred for another 15 minutes. Sulfuric acid was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 14 hr. Afterwards, the reactor was cooled to room temperature and the pressure released. The product was then transferred to storage.

$^{13}$C NMR confirmed product formation. The content of N-(hydroxyethoxy) ethyl acrylamide was 19.6 mole %, based on the total moles of mer units on the polymer. The product's mole ratio was about 32/44/20 which represents acrylic acid/acrylamide/N-(hydroxyethoxy) ethyl acrylamide.

EXAMPLE 7

The synthesis of a ammonium acrylate/N-Methoxypropyl acrylamide copolymer was effected in the following manner with the reactants in the amounts listed below:

| Reactant | Amount (g) |
|---|---|
| Poly(AA),25.6 weight % in water | 100.00 |
| Methxypropylamine | 10.09 |
| Ammonium Hydroxide, 29 weight % in water | 0.86 |

To prepare the polymer, Poly(AA)(32.0 wt %, pH=3.3, 15,000 MW) was placed in a beaker, which was cooled using an ice bath. Methoxypropylamine (available from Aldrich Chem. Co., in Milwaukee, Wis.) was added dropwise into the above water solution with vigorous stirring. Afterwards, the solution was stirred for another 15 minutes. Aqueous caustic was added to adjust the pH to about 5. Next, the reaction mixture was transferred into a 300 mL Parr reactor with a pressure rating of at least 800 psi. The reactor then was assembled and purged with nitrogen for approximately 60 minutes. The Parr reactor was then slowly heated to 160° C. and held at that temperature for 8 hours. Afterwards, the reactor was cooled to room temperature and the pressure released. The product was then transferred to storage.

$^{13}$C NMR confirmed product formation. The content N-methoxypropyl acrylamide was 22.4 mole %, based on the total moles of mer units on the polymer, which represents both secondary amide and imide mer units. The polymer's molecular weight was 15,000.

EXAMPLE 8

The synthesis of an acrylic acid/acrylamide/N-Methoxypropyl acrylamide terpolymer was effected in the following manner with the reactants in the amounts listed below:

| Reactant | Amount (g) |
|---|---|
| Poly(AcAm), 50 weight % in water | 100.00 |
| Methoxypropylamine | 10.99 |
| Sulfuric Acid (95%) | 6.75 |
| Sodium Hydroxide (50 weight %) | 1.8 |

To prepare the polymer, Poly(AcAm) (50.0 wt %, Available from Aldrich Chemical Co., 10,000 MW) was placed in a beaker, which was cooled using an ice bath. Methoxypropylamine (available from Aldrich Chemical Co., in Milwaukee, Wis.) was added dropwise into the above water solution with vigorous stirring. Afterwards, the solution was stirred for another 15 minutes. Aqueous caustic was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 12 hours. Afterwards, the reactor was cooled to room temperature and the pressure released. The product was then transferred to storage.

$^{13}$C NMR confirmed product formation. The content N-methoxypropyl acrylamide was 20.3 mole %, based on the total moles of mer units on the polymer, which represents both secondary amide and imide mer units. The product's mole ratio was about 33.8/45120 which represents acrylic acid/acrylamide/N-(methoxypropyl) acrylamide. The polymer's molecular weight was 18,500.

EXAMPLE 9

The synthesis of an acrylic acid/acrylamide/N-Methoxyethyl acrylamide terpolymer was effected in the following manner with the reactants in the following manner with the reactants in the amounts listed below:

| Reactant | Amount (g) |
|---|---|
| Poly(AA/AcAm), 31.4 weight % in water | 100 |
| Methoxyethylamine | 19.65 |
| Sulfuric Acid (95%) | 10.20 |

To prepare the polymer, Poly(A/AcAm) (31.4 wt %, 11,000 MW) was placed in a beaker, which was cooled using an ice bath. Methoxyethylamine (available from Aldrich Chemical Co., in Milwaukee, Wis.) was added dropwise into the above water solution with vigorous stirring. Afterwards, the solution was stirred for another 15 minutes. The pH of the reaction mixture was measured using water-wet pH strips. Aqueous caustic was added to adjust the pH to about 5.6. Next, the reaction mixture was transferred into a 300 mL parr reactor with a pressure rating of at least 800 psi. The reactor then was assembled and purged with nitrogen for approximately 60 minutes. The Parr reactor was then slowly heated to 138° C. and held at that temperature for 12 hours.

Afterwards, the reactor was cooled to room temperature and the pressure released. The product was then transferred to storage.

$^{13}$C NMR confirmed product formation. The content N-methoxypropyl acrylamide was 40.8 mole %, based on the total moles of mer units on the polymer, which represents both secondary amide and imide mer units. The product's mole ratio was about 40/14/41 which represents acrylic acid/acrylamide/N-(methoxypropyl) acrylamide. The polymer's molecular weight was 11,000.

EXAMPLE 10

The synthesis of a sodium acrylate/acrylamide/N-alkoxylated acrylamide copolymer was effected in the following manner with the reactants in the amounts listed below:

| Reactant | Amount (g) |
| --- | --- |
| Poly(AA/AcAm), 50/50 mole % 43.8 weight % in water | 100 |
| Jeffamine M-1000 | 60 |
| Sodium Hydroxide (50 weight %) | 11.78 |
| Deionized Water | 100 |

To prepare the polymer, Poly(A/AcAm) (43.8 wt %, pH=4.0, 18,000 MW) was placed in a beaker, which was cooled using an ice bath. Jeffamine M-1000 (available from Texaco Chemical Co.) was added dropwise into the above water solution with vigorous stirring. Afterwards, the solution was stirred for another 15 minutes. Aqueous caustic was added to adjust the pH to about 6.9. Next, the reaction mixture was transferred into a 300 mL parr reactor with a pressure rating of at least 800 psi. The reactor then was assembled and purged with nitrogen for approximately 60 minutes. The Parr reactor was then slowly heated to 150° C. and held at that temperature for 5 hours. Afterwards, the reactor was cooled to room temperature and the pressure released. The product was then transferred to storage.

EXAMPLE 11

The synthesis of a sodium acrylate/ N-hydroxy (ethylamino)ethyl acrylamide terpolymer was effected in the following manner with the reactants in the amounts listed below:

| Reactant | Amount (g) |
| --- | --- |
| Poly(AA), 27.0 weight % in water | 100.00 |
| (Aminoethylamino)ethanol | 12.89 |
| Sulfuric Acid (95%) | 0.6 |

To prepare the polymer, Poly(AA) (27.0 weight %, pH=3.4, 17,000 MW) was placed in a beaker, which was cooled using an ice bath. (Aminoethylamino)ethanol (available from Aldrich Chem. Co., in Milwaukee, Wis.) was added dropwise into the above water solution with vigorous stirring. Afterwards, the solution was stirred for another 15 minutes. Sulfuric acid was added to adjust the pH to about 5.6. Next, the reaction mixture was transferred into a 300 mL Parr reactor with a pressure rating of at least 800 psi. The reactor then was assembled and purged with nitrogen for approximately 60 minutes. The Parr reactor was then slowly heated to 138° C. and held at that temperature for 14 hours. Afterwards, the reactor was cooled to room temperature and the pressure released. The product was then transferred to storage.

$^{13}$C NMR confirmed product formation. The content of N-hydroxy(ethylamino) ethyl acrylamide was about 30 mole %, based on the total moles of mer units on the polymer, representing both secondary amide and imide mer units. The product's mole ratio was approximately 70/30 which represents acrylic acid/N-(hydroxyethylamino) ethyl acrylamide. The product polymer's molecular weight was 32,000.

EXAMPLE 12

The activity of polymers for calcium phosphate scale inhibition were evaluated in the following manner.

An acidic stock solution was prepared containing calcium chloride, magnesium sulfate, and phosphoric acid. Aliquots of this stock solution were transferred to flasks so that on dilution, the final concentration of calcium was 750 or 1500 ppm as $CaCO_3$. Iron or aluminum were added in 750 ppm Ca tests. The appropriate volume of inhibitor was added to give 20 ppm polymer for the 1500 ppm Ca tests, 25 ppm polymer for the iron tests or 30 ppm polymer for the aluminum tests. D1 water was added, and the flasks were heated to 70° C. in a water bath. Stirring was maintained at 250 rpm with 1" stir bars.

Once the solutions were at temperature, the pH was adjusted to 8.5. pH was checked frequently to maintain 8.5. Filtered samples were taken after four hours. Then, 100 ml of the solution was taken and boiled for 10 minutes in a covered flask. The volume was brought back to 100 ml with D1 water, and filtered samples were taken again. Standard colorimetric analyses determined ortho phosphate concentration in the samples. Percent phosphate is reported as 100*P(filt)/P(unfilt). When no polymer was added, 4–6% filterable phosphate was obtained.

Percent inhibition numbers above 80% indicate exceptional dispersant activity. Polymers which disperse the phosphate in this test are observed to prevent calcium phosphate scale in recirculating cooling water systems under similar high stress conditions. Numbers less than about 40% indicate poor dispersant activity. Such polymers may or may not work under milder conditions (softer, cooler water), but do allow scale to form under high stress conditions. Polymers with intermediate activity are still good dispersants for low stress conditions, but will lose activity at higher stress.

TABLE I

Calcium Phosphate Dispersancy Test - High Stress Conditions

| | Percent Inhibition at 20 ppm Polymer | | |
| --- | --- | --- | --- |
| Polymer | Ca Test | Fe Test | Al Test |
| A[1] | 37 | 46 | 34 |
| B[2] | 33 | — | — |
| C[3] | 60 | — | 20 |
| D[4] | 89 | — | — |
| E[5] | 87 | 43 | 33 |
| F[6] | 82 | 44 | 58 |
| G[7] | 70 | 57 | 46 |
| H[8] | 53 | — | — |
| I[9] | 63 | — | — |
| J[10] | 71 | — | — |
| K[11] | 26 | — | — |

[1] = conventional treatment 1, sulfonated p(AA/AcAm)
[2] = polymer prepared according to a procedure similar to Example 10; 10/40/50 mole ratio of Jeffamine/AA/AcAm, 60,000 MW
[3] = polymer prepared according to a procedure similar to Example 10; 20/40/40 mole ratio of Jeffamine/AA/AcAm, 10,000 MW
[4] = polymer prepared according to a procedure similar to Example 10; 40/40/20 mole ratio of Jeffamine/AA/AcAm, 20,000 MW

TABLE I-continued

Calcium Phosphate Dispersancy Test - High Stress Conditions

| | Percent Inhibition at 20 ppm Polymer | | |
|---|---|---|---|
| Polymer | Ca Test | Fe Test | Al Test |

[5] = polymer prepared according to a procedure similar to Example 3
[6] = polymer prepared according to a procedure similar to Example 1
[7] = polymer prepared according to the procedure of Example 2; 33/41/26 mole ratio of AEE/AA/AcAm
[8] = polymer prepared according to the procedure of Example 4; 34/41/17 mole ratio of MOPA/AA/AcAm
[9] = polymer prepared according to the procedure of Example 5; 51/46/3 mole ratio of AA/AEAE/AcAm
[10] = polymer prepared according to the procedure of Example 9
[11] = conventional treatment 2, p(AA/AcAm) available from Nalco Chemical Co., Naperville, IL

EXAMPLE 13

The following dispersancy test procedure was utilized to obtain the results shown in Table II. 200 mL of a test solution containing 20 ppm of a polymer dispersant and 20 ppm of PBTC dissolved in distilled water was prepared. Then the test solution was added to a 250 mL erlenmeyer flask magnetically stirred at 40° C. Hardness and m-alkalinity are added to the solution over seven minutes to achieve a final solution composition (ppm as Ca $CO_3$) of 700 ppm $Ca^{2+}$, 350 ppm $Mg^{2+}$, and 700 ppm $CO_3^{2-}$. As calcium carbonate precipitation proceeds, the particle monitor responds to the fraction of calcium carbonate particles greater than 0.5 microns in diameter. The more effectively dispersed the calcium carbonate particles, the lower the fraction of large particle agglomerates. Better performing test solutions are indicated by (1) lower particle monitor intensities, and (2) intensity maxima achieved at longer times (60 minute limit).

Examples 1 and 7 are the best performing dispersants for preventing calcium carbonate particle agglomeration evidenced by (1) the smallest particle monitor intensity and (2) requiring longer times to achieve their maximum signal response. Traditional dispersants (polyacrylic acid) provide improved dispersancy over the blank, but do not perform as well as the examples cited.

TABLE II

| Dispersant (20 ppm total actives) | Particle Monitor Intensity (time) |
|---|---|
| Blank[1] | 100 (12 minutes) |
| Poly(acrylic acid) | 57 (45 minutes) |
| L[2] | 15 (55 minutes) |
| M[3] | 12 (60 minutes) |

[1] = 20 ppm PBTC
[2] = polymer prepared according to the procedure of Example 1
[3] = polymer prepared according to the procedure of Example 7

Changes can be made in the composition, operation and arrangement of the method of the present invention described herein without departing from the concept and scope of the invention as defined in the following claims:

We claim:

1. A method for preventing scale formation on metal surfaces which transfer heat and which are in contact with scale-forming cooling water within a cooling water system which comprises the step of treating said water with an effective scale-inhibiting amount of a water-soluble polymer and preventing the formation of scales on the metal surfaces, the polymer having:

A) a mer unit of the formula

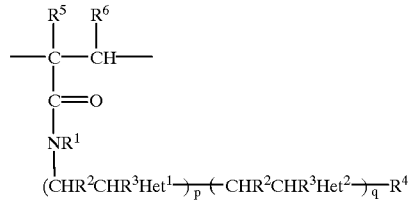

I wherein $R^1$–$R^6$ are hydrogen, P=1, q=1, $Het^1$ is nitrogen, and $Het^2$ is oxygen; and B) at least one mer unit selected from the group consisting of acrylic acid, acrylamide, and combinations thereof, wherein said scale is selected from the group consisting of: calcium phosphate, zinc phosphate, iron(hydr) oxide, aluminum hydroxide, calcium sulfate, magnesium phosphate, calcium sulfate, calcium oxalate and calcium carbonate;

whereby scale formation is prevented.

2. A method for preventing scale formation on metal surfaces which transfer heat and which are in contact with scale-forming cooling water within a cooling water system which comprises the step of treating said water with an effective scale-inhibiting amount of a water-soluble polymer and preventing the formation of scales on the metal surfaces, the polymer having:

A) a mer unit of the formula

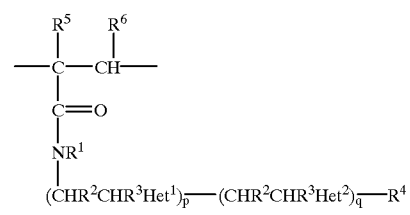

I wherein $R^1$–$R^6$ are hydrogen, P=1, q=1, $Het^1$ is nitrogen, and $Het^2$ is oxygen; and B) a mer unit selected from the group consisting of acrylic acid, maleic acid, and combinations thereof, wherein said scale is selected from the group consisting of: calcium phosphate, zinc phosphate, iron(hydr) oxide, aluminum hydroxide, calcium sulfate, magnesium phosphate, calcium sulfate, calcium oxalate and calcium carbonate;

whereby scale formation is prevented.

3. The method of claim 2 wherein p=1, q=1, $Het^1$ is nitrogen, $Het^1$ is oxygen and $R^1$, $R^2$, $R^3$, $R^4$, $R^5$ and $R^6$ are hydrogen in formula I of step A; and the mer units of step B are acrylic acid for the water-soluble polymer.

4. A method for preventing scale formation on metal surfaces which transfer heat and which are in contact with scale-forming cooling water within a cooling water system which comprises the step of treating said water with an effective scale-inhibiting amount of a water-soluble polymer and preventing the formation of scales on the metal surfaces, the polymer having distributed repeating mer units of the formula

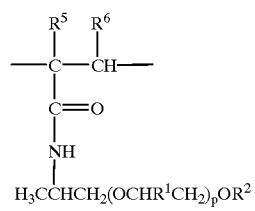

wherein $R^1$ is selected from the group consisting of hydrogen and $C_1$–$C_3$ alkyl; p is an integer from 0–50; $R^2$ is selected from the group consisting of hydrogen and $C_1$–$C_{20}$ alkyl groups; $R^5$ and $R^6$ are selected from the group consisting of hydrogen, carboxylates, $C_1$–$C_3$ alkyl groups, carboxylates, $C_1$–$C_3$ alkyl groups, and a cycloalkyl group of 3 to 6 carbon atoms formed by the linkage of $R^5$ and $R^6$ as a ring, with the proviso that when p=0, $R^2$ is not hydrogen, wherein said scale is selected from the group consisting of: calcium phosphate, zinc phosphate, iron(hydr)oxide, aluminum hydroxide, calcium sulfate, magnesium phosphate, calcium sulfate, calcium oxalate and calcium carbonate;

whereby scale formation is prevented.

5. A method for preventing scale formation on metal surfaces which transfer heat and which are in contact with scale forming cooling water within a cooling water system which comprises the step of treating said water with an effective scale-inhibiting amount of a water-soluble polymer and preventing the formation of scales on the metal surfaces, the polymer having:

A) a mer unit of the formula

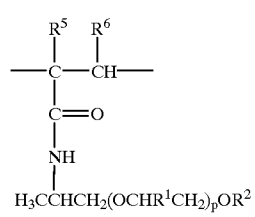

wherein $R^1$ is selected from the group consisting of hydrogen and $C_1$–$C_3$ alkyl; p is an integer from 0–50; $R^2$ is selected from the group consisting of hydrogen and $C_1$–$C_{20}$ alkyl groups; $R^5$ and $R^6$ are selected from the group consisting of hydrogen, carboxylates, $C_1$–$C_3$ alkyl groups, and a cycloalkyl group of 3 to 6 carbon atoms formed by the linkage of $R^5$ and $R^6$ as a ring, with the proviso that when p=0, $R^2$ is not hydrogen; and B) a mer unit selected from the group consisting of acrylic acid, methacrylic acid, acrylamide, methacrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof, wherein said scale is selected from the group consisting of: calcium phosphate, zinc phosphate, iron(hydr)oxide, aluminum hydroxide, calcium sulfate, magnesium phosphate, calcium sulfate, calcium oxalate and calcium carbonate;

whereby scale formation is prevented.

6. A method for preventing scale formation on metal surfaces in contact with scale-forming cooling water within a cooling water system which comprises the step of treating said water with an effective scale-inhibiting amount of a water-soluble polymer having:

A) a mer unit of the formula

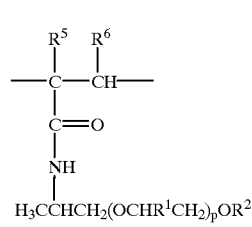

wherein $R^1$ is selected from the group consisting of hydrogen and $C_1$–$C_3$ alkyl groups, p is an integer from 0–50; $R^2$ is selected from the group consisting of hydrogen and $C_1$–$C_{20}$ alkyl groups; $R^5$ and $R^6$ are selected from the group consisting of hydrogen, carboxylates, $C_1$–$C_3$ alkyl groups, and a cycloalkyl group of 3 to 6 carbon atoms formed by the linkage of $R^5$ and $R^6$ as a ring, with the proviso that when p=0, $R^2$ is not hydrogen; and B) a mer unit selected from the group consisting of acrylic acid, methacrylic acid, acrylamide, methacrylamide, maleic anhydride, itaconic acid, vinyl sulfonic acid, styrene sulfonate, N-tertbutylacrylamide, butoxymethylacrylamide, N,N-dimethylacrylamide, sodium acrylamidomethyl propane sulfonic acid, vinyl alcohol, vinyl acetate, N-vinyl pyrrolidone, maleic acid, and combinations thereof, wherein said scale is selected from the group consisting of: calcium phosphate, zinc phosphate iron(hydr)oxide, aluminum hydroxide, calcium sulfate, barium sulfate, clay silt, magnesium carbonate, magnesium phosphate, magnesium silicate, calcium sulfate, barium sulfate, calcium oxalate and calcium carbonate;

whereby scale formation is prevented.

7. The method of claim 6 where in p is an integer of from 10 to 25, $R^1$ is selected from the group consisting of hydrogen and methyl groups, $R^2$ is a methyl group, $R^5$ is hydrogen and $R^6$ is hydrogen and the mer units of step B are acrylic acid.

8. The method of claim 6 where in p is an integer of from 10 to 25, $R^1$ is selected from the group consisting of hydrogen and methyl groups, $R^2$ is a methyl group, $R^5$ is hydrogen and $R^6$ is hydrogen and the mer units of step B are acrylic acid and acrylamide.

9. The method of claim 6 where in p is an integer of from 10 to 25, $R^1$ is selected from the group consisting of hydrogen and methyl groups, $R^2$ is a methyl group, $R^5$ is hydrogen and $R^6$ is hydrogen and the mer units of step B are maleic acid and acrylic acid.

10. The method of claim 6 wherein said cooling water contains compounds selected from the group consisting of: biocides, corrosion inhibitors, scale inhibitors and combinations thereof.

* * * * *